(12) United States Patent
Vemulapelli et al.

(10) Patent No.: US 9,762,530 B2
(45) Date of Patent: *Sep. 12, 2017

(54) INSTANT MESSAGING INTEROPERABILITY BETWEEN DISPARATE SERVICE PROVIDERS

(71) Applicant: EXCALIBUR IP, LLC, New York, NY (US)

(72) Inventors: Rajanikanth Vemulapelli, San Jose, CA (US); Ming Judy Lu, Sunnyvale, CA (US); Jayarama Kumar Kota, Mountain View, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,501

(22) Filed: Jun. 8, 2015

(65) Prior Publication Data

US 2015/0271129 A1    Sep. 24, 2015

Related U.S. Application Data

(63) Continuation of application No. 11/528,753, filed on Sep. 27, 2006, now Pat. No. 9,053,461.

(60) Provisional application No. 60/724,577, filed on Oct. 7, 2005.

(51) Int. Cl.
| | |
|---|---|
| *G06F 15/16* | (2006.01) |
| *H04L 12/58* | (2006.01) |
| *G06Q 10/10* | (2012.01) |
| *H04L 29/08* | (2006.01) |
| *H04L 29/06* | (2006.01) |

(52) U.S. Cl.
CPC .......... *H04L 51/36* (2013.01); *G06Q 10/107* (2013.01); *H04L 12/581* (2013.01); *H04L 12/5835* (2013.01); *H04L 51/04* (2013.01); *H04L 51/046* (2013.01); *H04L 51/066* (2013.01); *H04L 67/10* (2013.01); *H04L 69/08* (2013.01)

(58) Field of Classification Search
CPC ........................... H04L 12/5815; H04L 69/08
USPC ......................................................... 709/207
See application file for complete search history.

(56) References Cited

U.S. PATENT DOCUMENTS

| | | | |
|---|---|---|---|
| 2002/0120779 A1* | 8/2002 | Teeple .............. | H04L 29/06027 709/246 |
| 2003/0018726 A1* | 1/2003 | Low ..................... | H04L 12/581 709/206 |
| 2005/0213537 A1* | 9/2005 | Ingimundarson ..... | H04L 12/581 370/329 |

* cited by examiner

*Primary Examiner* — Wing F Chan
*Assistant Examiner* — Andrew Woo
(74) *Attorney, Agent, or Firm* — James J. DeCarlo; Greenberg Traurig, LLP

(57) ABSTRACT

An apparatus for facilitating instant messaging communications between clients of different instant messaging service provider networks is provided. The apparatus includes translation logic for translating received communications related to an instant messaging service, the received communications associated with an external instant messaging service provider network and formatted according to a secondary protocol. The translation logic translates the received communication from the secondary protocol to a primary protocol, the primary protocol native to a receiving service provider network. The communication may then be routed to a client of the primary network according to the native, primary protocol.

14 Claims, 18 Drawing Sheets

INSTANT MESSAGING INTEROPERABILITY BETWEEN DISPARATE SERVICE PROVIDERS

CROSS-REFERENCE TO RELATED APPLICATION

This application is a continuation of U.S. Non-Provisional application Ser. No. 11/528,753, filed on Sep. 27, 2006, now U.S. Pat. No. 9,053,461, entitled "Instant Messaging Interoperability Between Disparate Service Providers", which claims benefit of priority to previously filed U.S. provisional patent application Ser. No. 60/724,577, filed on Oct. 7, 2005, entitled INSTANT MESSAGING INTEROPERABILITY BETWEEN DISPARATE SERVICE PROVIDERS, the entireties of these applications is incorporated by reference as if fully set forth herein.

BACKGROUND

Field

This relates generally to instant messaging via a network, such as the Internet or an intranet, and in particular, instant messaging between two or more users of disparate instant messaging providers.

Description of Related Art

Instant messaging technology generally enables two or more participants to communicate over a computer network, such as the Internet or an internet (e.g., a private network), in more or less real time. Typically, each participant uses a client computer system to send and receive messages (including, e.g., text, voice, files, and the like) via a user interface. Each client computer in communication is connected via a network to a common instant messaging service provider and connection server. The connection server receives and processes messages from participants, including by forwarding them to the client systems of the other participants for display. The connection server may also be configured to send messages on behalf of the system, such as to inform participants that a fellow participant has disconnected or logged off.

Typically, instant messaging application software is installed at each client system to enable the client system to be used as an instant messaging client. The instant messaging software may be made available for download, for example, from a web page accessible via the Internet. A user invokes this software on the client system in order to communicate by instant messaging with one or more other participants. The client side application software typically establishes a connection between the client system and the connection server and either automatically logs the user into the connection server or prompts the user to enter the information necessary to log in, such as a user name and password. The user may then communicate by means of instant messaging with one or more other users who are logged into the instant messaging system at that time.

There are several known instant messaging systems and service providers, such as MSN ® Messenger, Yahoo! ® Messenger, AOL ® Instant Messenger ("AIM"), and the like. Generally, a client using one of the instant messaging systems is unable to exchange instant messages with a client using a different instant messaging system because most instant messaging services (or service providers) use proprietary solutions. For example, a client using MSN ® Messenger may typically communicate with other clients using the same system, e.g., the same instant messaging provider, but is unable to communicate with clients using other instant messaging service providers, such as Yahoo! ® Messenger.

Accordingly, it is desirable to allow communication and interoperability between two or more networks for instant messaging systems. Further, it is desirable to provide presence indicators and buddy list information for participants associated with one or more external networks and instant messaging providers.

SUMMARY

According to one aspect and one example of the present invention, a system for facilitating instant messaging communication and events between users of disparate instant messaging service providers is provided. The system comprises translation logic associated with a primary instant messenger service provider network operable to translate communications received from an external server. In particular, the translation logic translates communications received from the external server from a secondary protocol to a primary protocol, the primary protocol native to the system.

In one example, an apparatus for facilitating instant messaging communications between users of different instant messaging service providers includes interface logic and translation logic. The interface logic receives communications related to an instant messaging service, the received communications associated with an external instant messaging service provider network and formatted according to a secondary protocol. The apparatus further includes translation logic for translating the received communication from the secondary protocol to a primary protocol, the primary protocol native to a receiving service provider network.

In some examples, the received communications are received from the external instant messaging service provider network (e.g., an external network client routes the communications to the external network, which in turn routes the communications to the primary network). The communications may include various instant messaging communications and events such as subscribe requests, invite requests, unsubscribe requests, watcher notifications, and the like.

Additionally, the apparatus may further include or communicate with one or more of a gateway event server, event server, SIP gateway, edge proxy, session manager (e.g., for storing run-time dialog states, SIP dialog routing information, etc.), gateway database (e.g., for storing buddy lists, persistent information, etc.), connection server, connection manager, and so on.

According to another example, a method for facilitating instant messaging communications between users of different instant messaging service providers is provided. In one example, the method includes the acts of receiving a communication related to an instant messaging service from an external instant messaging service provider network, wherein the received communication is formatted according to a secondary protocol, and translating the received communication from the secondary protocol to a primary protocol.

According to another example, computer-readable medium comprising instructions for facilitating instant messaging communications over different service provider networks is provided. In one example, the instructions are for causing the performance of a method including translating a communication related to an instant messaging service and directed to a primary instant messaging service provider network, the received communication associated with an external instant messaging service provider network, where the communication is translated from a secondary protocol to a primary protocol, the primary protocol native to the primary instant messaging service provider network.

The present invention and its various aspects are better understood upon consideration of the detailed description below in conjunction with the accompanying drawings and claims.

DETAILED DESCRIPTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Figure 1:
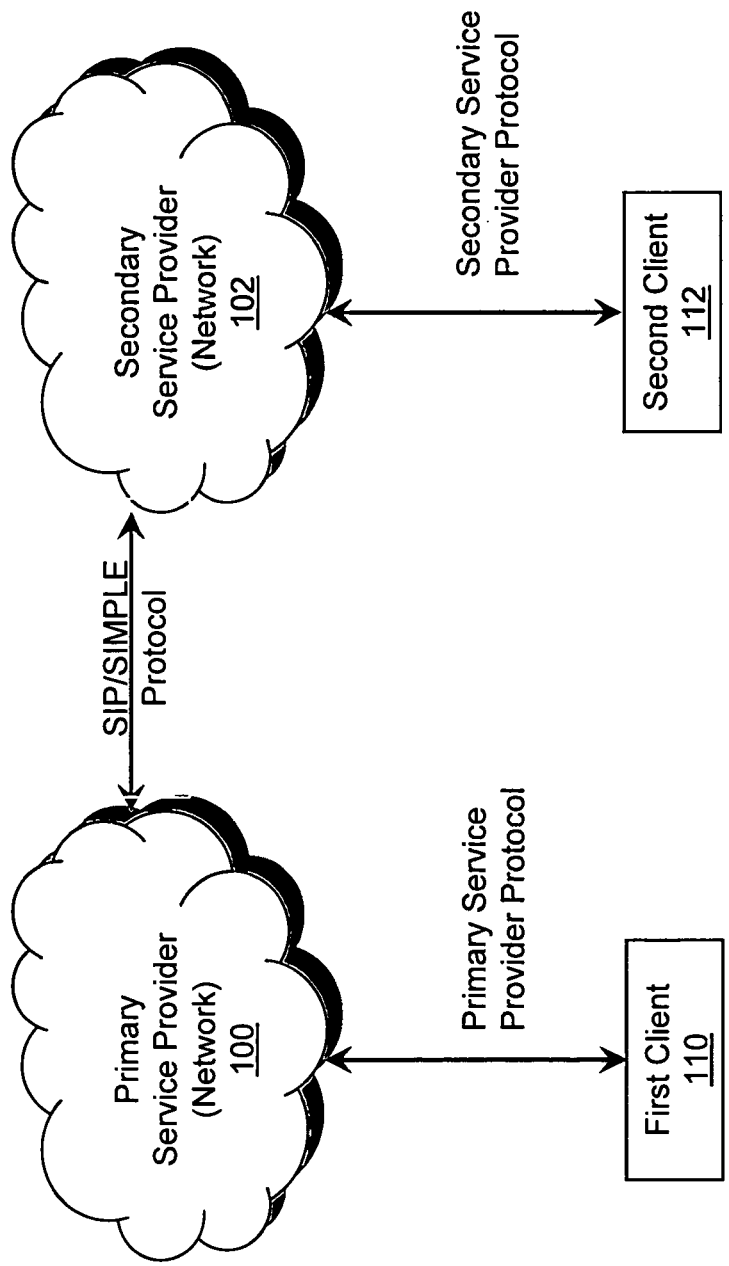
FIG. 1 schematically illustrates an exemplary system and environment for communication between two instant messaging service providers having server-to-server interoperability.

FIG. 1 illustrates an exemplary system and environment in which some aspects described herein may be used. Broadly, a first instant messenger ("IM") service provider 100 having a plurality of first clients 110 logged in, e.g., via a first service provider protocol, and a second IM service provider 102 having a plurality of second clients 112 logged in, e.g., via a second service provider protocol, are illustrated. The first and second IM service providers 100, 102 communicate to enable the first client 110 to send and receive instant messages with the second client 112. In one example, the communication is between the first and second networks 100, 102 directly, e.g., between respective servers or other network components of each network (as opposed to first client 110 communicating directly to second network 102 or second client 112 communicating directly to first network 100). Such a system may allow for interoperability between disparate IM providers.

The first and second IM service providers 100, 102 may communicate, at least in part and in one example, via Session Initiation Protocol ("SIP") and Session Initiation Protocol for Instant Messaging and Presence Leveraging Extensions ("SIMPLE") based protocol. SIP/SIMPLE is illustrative of one protocol for intercommunication and interoperability between a first and second IM service provider for IM and presence functionality. Further, SIP/SIMPLE may support server-to-server interoperability for voice, video, and the like.

In one example, the specific SIP/SIMPLE protocol for Server-to-Server Interoperability purposes includes SIP RFC 3261, SIP RFC 3265, and/or PIDF RFC 3863. Additionally, communication between the networks may communicate Server-to-Server over TCP with desired levels of security and IP filtering.

Those of ordinary skill in the art will recognize that various other communication protocols (whether open or proprietary) are possible and contemplated whether used alone or in combination with other communication systems/methods. Various modifications may be made to the SIP/SIMPLE protocol depending, for example, on the particular IM service providers and functionality desired. For example, one may modify the any well known protocol such as SIP/SIMPLE to be used more efficiently (e.g., with respect to transmission speed, process, cost, etc.) within a given network. Further, other suitable communication protocols such as XMPP or the like that enable or facilitate communication and/or interoperability between disparate IM providers may be used alone or in combination with the SIP/SIMPLE protocol.

Clients 110 and 112 may include, for example, a user accessing IM accounts via an internet browser, a personal computer, mobile device, such as a cellular phone or laptop personal computer and the like. A user is typically connected via a network (such as the Internet or an intranet) to one or more servers including a respective IM service provider for the particular user IM account. The network may further include various other servers such as a gateway server, proxy server, account server, email server, mobile server, and the like.

A client via a computer device may communicate via a wireless network, such as a wireless gateway, e.g., a cellular, satellite, or other wireless network. Additionally, the computer device may communicate via a non-wireless network such as a cable or fiber optic network, or a combination of wireless and non-wireless systems. The computer device may include suitable hardware and software, such as a processor connected to an input device such as a keyboard, a network interface, a memory, and a display. The memory may include logic or software operable with the device to perform some of the functions described herein. The device may be operable to include a suitable interface for a messaging facility, such as an email inbox, instant messaging (IM), short messaging service (SMS), multimedia messaging service (MMS), and the like. The device may further be operable to display a web browser for accessing the Internet or user accounts, including webmail environments such as a Yahoo!® mail account or Hotmail® account, for example.

Networks 100, 102 may be in communication with or include one or more server and database systems in communication with one another and capable of wirelessly communicating with devices of a plurality of users. Exemplary server systems may include various routers, databases, gateways, and servers, such as an edge or proxy server, a gateway server, a mobile server, email sever, web server, voice messaging server, and the like. Further, network 20 may include a wireless network and one or more local area networks (LANs) and/or wide area networks (WAN), such as the Internet, that enables communication between various users, devices, servers, agents, modules, clients, processors, and the like.

In one exemplary operation, a user via client 110 signs-in to the primary network with a valid ID and password. After a user signs-in successfully into the primary network 100, client 110 and/or primary network 110 sends subscriptions for presence/status of buddies that are on the secondary network 102, and sends notifications to the watchers (e.g., client 112 associated with client 110) on the secondary network 102 indicating presence/status on the primary network. If a user is signed out of the primary network, appropriate subscription/notification messages are sent to the buddies on the secondary network A user may also block/ignore contacts from the Secondary Network; add a new contact from the Secondary Network by using that contact's ID for the Secondary Network; delete a contact from the Secondary Network; and rename a contact from the Secondary Network.

Figure 2:
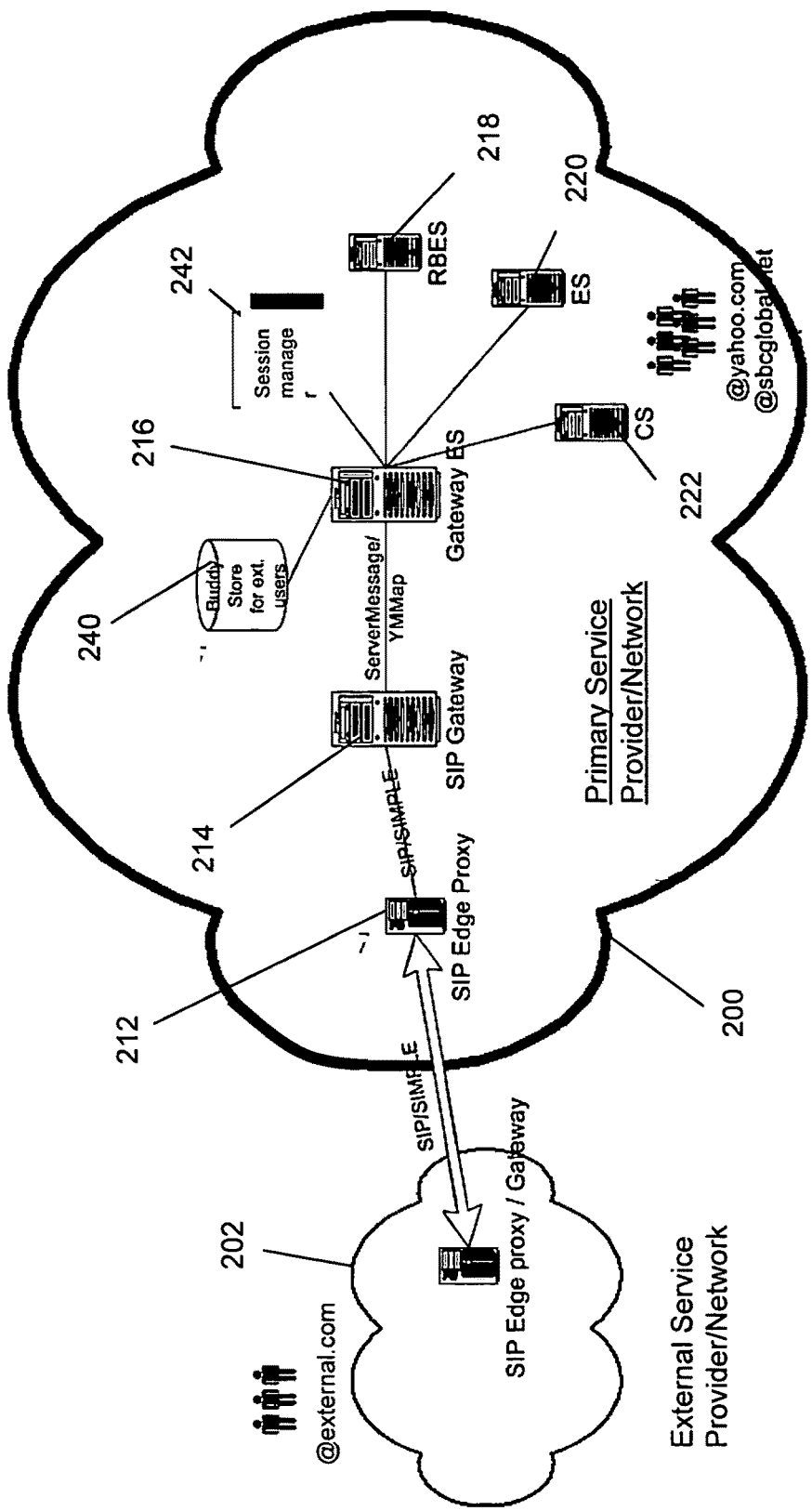
FIG. 2 schematically illustrates an exemplary primary network backend associated with a first instant messaging provider in communication with an external or secondary network/instant messaging service provider network.

FIG. 2 illustrates an overview of an exemplary IM service provider network in which some aspects described herein may be used. Not all the components may be required, and variations in the arrangement and type of the components may be made without departing from the spirit and scope of the various inventions.

In one example, a primary or first network 200 corresponding to a first IM service provider includes an edge proxy 212. The edge proxy 212 may be configured for SIP/SIMPLE or other communication protocol(s) used between the first IM service provider and one or more external or foreign networks including one or more IM service providers, such as foreign network 202. In particular, edge proxy 212 provides connection handling and routing to the external network(s). The edge proxy 212 component is optional, and in other examples the gateway 214 may communicate directly to another server or network component (for example, directly with an edge proxy or gateway of another network). Implementing a generic edge proxy 212, however, may make it easier to federate with more than one external network. The inclusion of edge proxy 212 may also help centralize the federation routing and connection handling to one or more external networks.

In this example, gateway 214 is the last SIP node into the first network and proxies clients of the first network as SIP end points to the external network(s). Thus, gateway 214 includes logic operable to translate SIP/SIMPLE communications/events/etc. into native or primary protocol communications within the backend of network 200. For example, gateway 214 serves to convert SIP traffic to a native or primary protocol for the particular primary network/IM service provider and vice versa. Typically, the scalability limitations of gateway 214 (or equivalent component) are dependent on the performance of a SIP stack implementation (as described in greater detail with respect to FIG. 3). Additionally, various optimizations may be performed at the SIP layer to implement batch subscriptions and notifications to improve the scalability depending on the particular network and/or component. In one example, gateway 214 is a SIP gateway wherein the SIP stack is optimized to handle batched Subscriptions and Notifications.

Gateway 216 comprises a gateway event server (ES) and handles communication with various backend servers, e.g., the native primary network servers such as reverse buddy event server 218, event server 220, and connection server 222. Gateway 216 may also be operable to export a generic subscription and dialog model that can be used with any type of external IM/presence protocol. In one example, gateway 216 is further stateless and highly scalable.

Gateway 216 may include or access a session manager 242 to store the run-time dialog state, and include or access buddy store 240 for storing the primary network buddies of external users. The buddy store 240 may include a database substitute for storing the primary account buddies (e.g., Yahoo! buddies, contacts, or the like) of the external users, which may be keyed by the external user address or other identifier, for example. When subscriptions from the external users come in, they are authorized against buddy store 240. This may be carried out by SQL implementations or alternatively replaced by a proprietary database.

The session manager 242 generally stores the transient state of the dialogs. In one example, session manager 242 uses in memory storage, a scalable distributed caching mechanism, but other implementations are possible.

Additional support from various other servers on the first network backend may be included. For example, rbum/rbes 218 may be operable to store and retrieve external id's in the reverse buddy lists. Event Server (ES) 220 may determine the external domains such that messages will be appropriately forwarded to the gateway 216 and hence to the SIP gateway 214 (and ultimately to the appropriate external network and external user).

Figure 3:
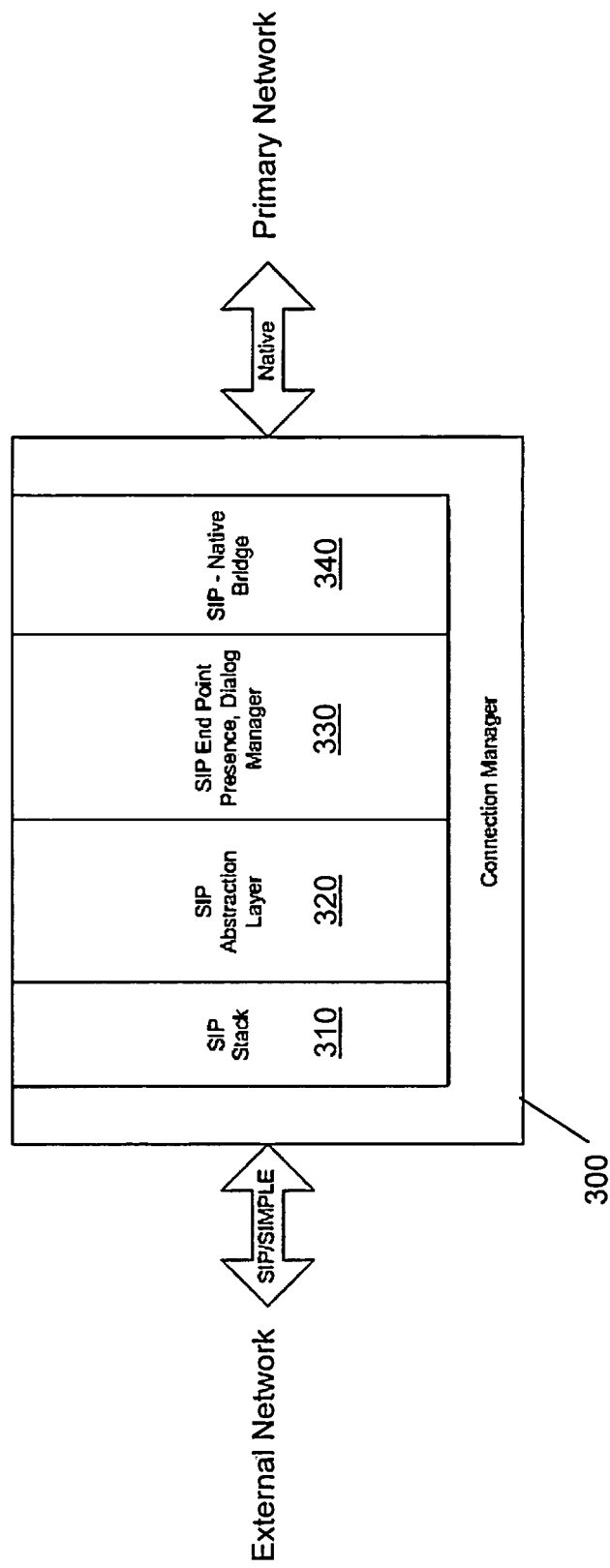
FIG. 3 schematically illustrates an exemplary gateway and connection between a primary service provider network backend and an external network.

FIG. 3 illustrates a block diagram of components of an exemplary gateway 300; for example, comprising a SIP/SIMPLE gateway (such as SIP gateway 214 shown in FIG. 2). The SIP/SIMPLE gateway comprises a "Connection Manager" that is operable to handle network I/O with other components/servers on either side of the network (for example, between the external network and the primary network/backend). It may also be operable for optional transport level security (e.g., encryption, authorization, and the like) and abstracts the transport level details from other components. The security mechanisms may vary from simple IP filtering to Mutual Transport Layer Security (MTLS) depending on the trust level of the component that it is interacting with. In one example, highly efficient asynchronous kqueue based I/O may be implemented for some or all of the network communications. Additionally; the size and behavior of the connection pool can be controlled via configuration parameters.

In one example, the gateway includes SIP stack 300, which may include an Open source SIP stack, commercial SIP stack, or a proprietary SIP stack. Further, a SIP Abstraction Layer 320, which may be operable to make the rest of the gateway implementation agnostic to the SIP stack 310 that is being used. A generic set of APIs and objects may provide this abstraction. As a result, the design is very conducive to adopting a completely different or modified SIP implementation if desired.

A SIP End Point Presence, Dialog Manager 330 is further included in this example. For example, for primary network clients that wish to communicate with an external/foreign client (e.g., an MSN client), this component creates a logical SIP termination point (end point). The termination points are created in an on-demand basis, whenever there is an interest from either side of the networks. The SIP SUBSCRIBE and INVITE dialogs attached to each of those termination points are tracked and managed by the dialog manager. The following SIP functionality may be handled by the SIP End Point Presence, Dialog Manager 330 on-behalf of primary network clients:

Send/Recv SUBSCRIBE on behalf of the primary network client.

Track, manage SUBSCRIBE dialogs (both incoming & outgoing) on behalf of the primary network client.

Send/Process SUBSCRIBE refresh on behalf of the primary network client.

Send/Recv NOTIFY on behalf of the primary network client.

Parse and digest PDIF presence information (PDIF: Presence Information Data Format).

Convert the primary network client presence alerts to PDIF format.

Send/Recv INVITE on behalf of the primary network client.

Track, manage INVITE dialogs on behalf of the primary network client.

Send/Recv IM on behalf of the primary network client.

Send/Recv Typing Notifications on behalf of the primary network client.

Send/Recv UNSUBSCRIBE on behalf of the primary network client.

The SIP end point presence, dialog manager 330 component may further maintain its own state information and look-up tables to assist in mapping various SIP dialogs to their corresponding primary network client termination points. Additionally, this component may be operable to maintain multiple points of presence (MPOP) or multiple termination points for the same primary network client.

Since there is typically more than one gateway machine running (e.g., on the primary network), and a given termination point has its associated state in only one of the gateway machines, the session manager (e.g., see FIG. 4) may further help route messages to the appropriate gateway machine and vice versa within the network. Appropriate logic may ensure that the messages are processed in the proper dialog context without compromising the scalability of the system.

Additionally, in this example, the gateway includes a SIP—Native Bridge 340. The SIP—Native Bridge 340 generally operates to convert messages between SIP format to the native backend format and vice versa, e.g., to a network native format and vice versa. A primary network, for example, may include servers using relatively fast, centralized state storage, which makes individual machines stateless. Such an architecture generally enables seamless clustering/load balancing between the Gateways and the primary network servers. The SIP—Native Bridge 340 talks to this cluster of primary network servers in the native primary network protocol. It also receives and processes messages from individual primary network clients targeted for external network clients.

FIGS. 4-21 illustrate various exemplary communications and event flows between components of a first network backend in communication with one or more external networks/instant messaging service providers.

Figure 4:
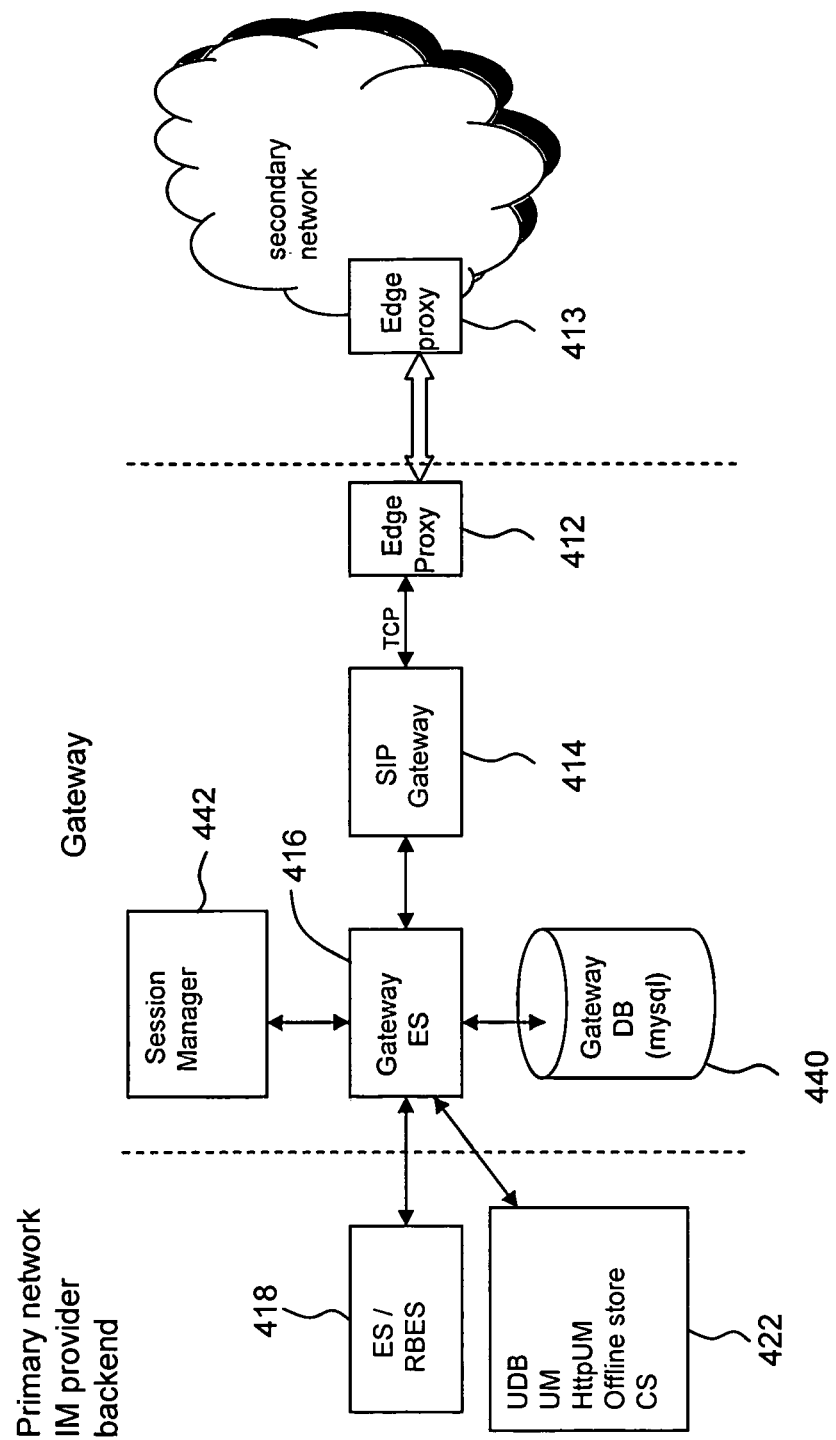
FIG. 4 schematically illustrates an exemplary primary network backend associated with a first instant messaging service provider in communication with an external or secondary network/instant messaging service provider.

FIG. 4 illustrates an overall architecture of a primary service provider network backend including a gateway in communication with an external network. In this example, an Edge Proxy (EP) 412 is provided for access control, provisioning, and routing to and from the external network, as well as for connection pooling and forwarding SIP/SIMPLE messages to and from the external network. Generally, the edge proxy 412 is operable and configured to communication with one or more domains. Further, a SIP Gateway (SGW) 414 operates to proxy primary network clients as SIP end points to the external network, map primary network instant messaging requests into SIP/SIMPLE messages and vice versa. In one example, the SGW 414 relies on a SIP stack (e.g., an Open source SIP stack, commercial SIP stack, or a proprietary SIP stack), and is stateful. Gateway ES (GWES) 416 operates to handle inter-domain gateway requests (mainly IM and presence); bridges SIP Gateway 414 and one or more primary network backend servers; GWES 416 is, in one example, stateless and highly scalable.

The architecture further includes a Session Manager (SM) 442 that stores SIP dialog routing information for the backend servers of the primary network. For example, each record is keyed by a primary network client id, gateway id, and dialog type (IM, presence, etc.), and contains an SGW key pointing to the particular SGW server 414 that holds the corresponding SIP dialog. The Session Manger server is in memory cache management system, which supports data partition and peer replication.

The gateway DB (GWDB) 440 stores persistent information for external users (for example, buddy lists or other information). In one example, MySQL server is used as persistent storage. In one example, the GWDB 440 is configured to support data partition and peer replication, but lacks shmproxy such as connection pooling capability.

FIG. 4 illustrates one implementation of exemplary architecture for communicating with an external network; however, various other architectures are possible. For example, various components may be deleted and/or their functionality combined with other components. A single gateway device may include logic for performing the functions of GWES 416 and SGW 414, for example. Additionally, in some examples, edge proxy 412 may be eliminated or its functionality carried out by another machine.

Figure 5:
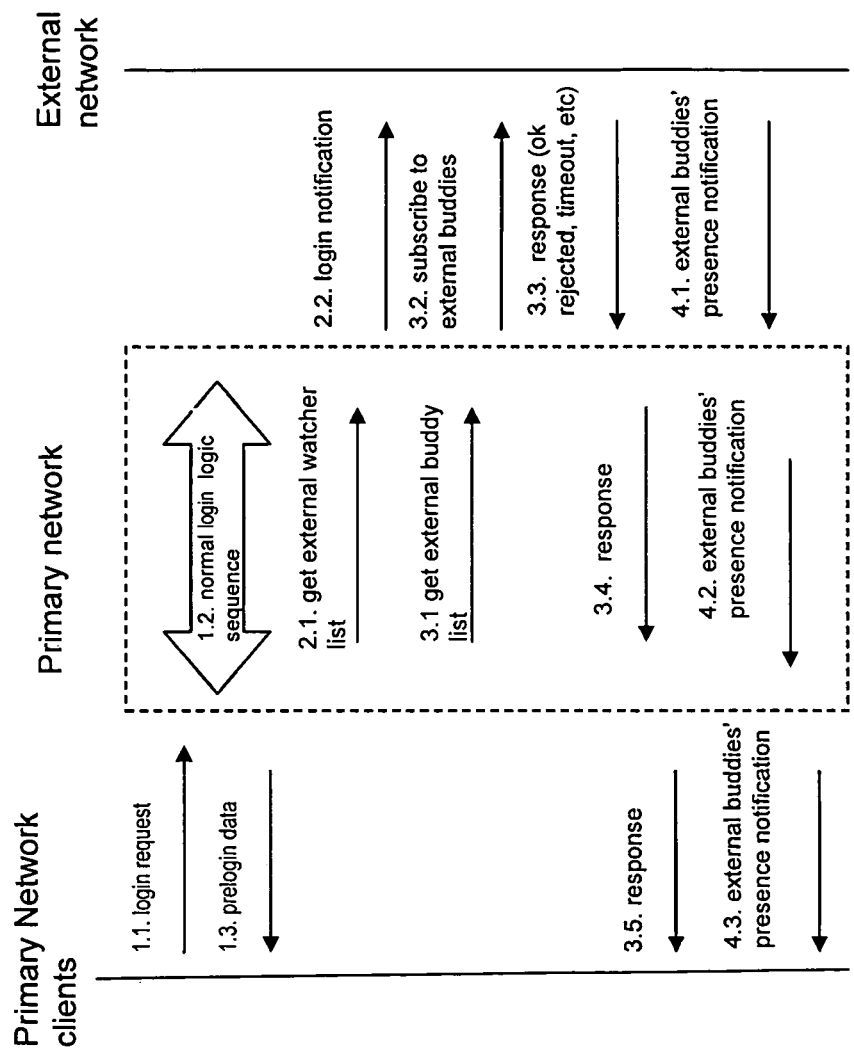
FIGS. 5-21 illustrate various exemplary communications and event flows between components of a primary network service provider backend in communication with one or more external networks/instant messaging service providers.

With continued reference to FIG. 4, FIG. 5 illustrates the login of a user to the primary network. Upon login by the user at 1.1, event server (ES) 420 (see FIG. 4) performs the following: For each buddy, ES 420 identifies his/her domain and sends this info to the client in prelogin data 1.3. Additionally, upon login 1.3, a notification is sent to external users/watchers such as reverse buddies (e.g., from ES server 420 to GWES 416 to SGW 414 and to the external network; 2.1-2.2). In one example, ES 420 notifies RBES (which may be included within ES 400) about user login and the RBES identifies external users/watchers on the clients reverse buddy list using domain info, and RBES sends notification to GWES 416. GWES 416 looks up an SGW key from SM 442, sorts external watchers accordingly, and sends the notification to SGW 414. SGW 414 looks up the dialogs for the external watchers in memory cache, and then sends SIP NOTIFY requests to the external network via the dialogs. If SGW 414 cannot find the dialog for an external watcher, it should send unsubscribe request back to GWES 416 to stop future notification.

Additionally, the client subscribes to presence information for external buddies (e.g., ES 420 to GWES 416 to SGW 414 to the external network; 3.1-3.5). In one example, ES 420 identifies external buddies on the primary service provider user's buddy list using federation domain info, and sends subscribe request to GWES 416. GWES 416 sends a subscribe request to SGW 414, and for each external buddy, SGW 414 checks if a dialog already exists for the subscription. If so, it sends request to external network to refresh the subscription; otherwise it creates a new dialog for the external network buddy, and sends SIP SUBSCRIBE request to the external network. When SGW 414 gets an ok or error response from the external network, it updates or deletes the corresponding cached dialog, then passes the response to GWES 416. If the response is "ok", GWES 416 saves the SGW key to SM 442. If the subscription is rejected with forbidden error, it means that the external user is no longer valid. GWES 416 may remove the external user from UDB 422 and GWDB 440, and may send notification to the primary network client.

In one example, an initial presence notification may be issued for successfully subscribed external buddies, and may include offline notification which can be filtered out by the client (e.g., external net work to SGW 414 to GWES 416 to the primary network client; 4.1-4.3). For example, an external network sends SGW 414 a notification. If no corresponding dialog is found, SGW 414 drops the notification; otherwise it passes the notification to GWES 416. GWES 416 converts the notification to the primary/native format or protocol, and GWES 416 gets target connection info from UM 420 and delivers the notification to the primary network client.

Figure 6:
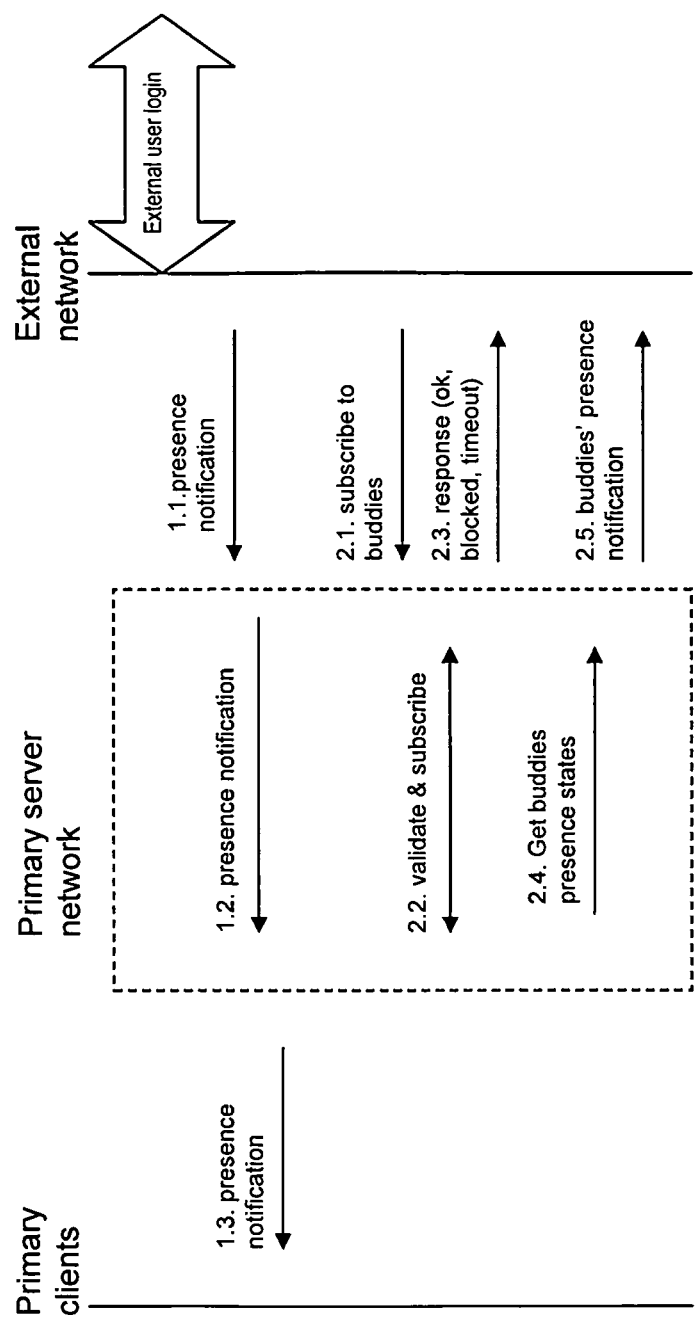

FIG. 6 illustrates exemplary login processes for external users. In this example, upon login by an external user, notification is sent to the primary network watchers (e.g., routed from external network to SGW 414 to GWES 416 to primary network client(s); 1.1-1.3). In particular, external network sends online notification to SGW 414 for each primary network watcher. SGW 414 looks up for the corresponding dialog for the primary network watcher, and if the dialog is not found, SGW 414 will send an error response to the external network, and the notification will not be delivered. If dialog is found, SGW 414 forwards the notification to GWES 416, where GWES 416 filters, translates, and delivers the notification to the primary network watcher.

The external user may then subscribe to watch a primary network client buddies' presence states (e.g., flowing from the external network to SGW 414 to GWES 416; 2.1-2.5). In particular, the external network sends a subscribe request for each primary network buddy. SGW 414 creates dialog for the subscription and sends subscribe request to GWES 416. GWES 416 looks up GWDB 440 to check if the primary network client is on the external user's buddy list, and if not, it interprets the request as an Add Buddy request. If the primary network client is on the buddy list but pending for approval, GWES 416 sends an ok response followed by offline notification to SGW 414. If the primary network client is an active buddy, GWES 416 sends a request to RBES 418 to add the external user to the primary network client's reverse buddy list, and then retrieves the primary network client's initial presence state from UM 420, translates the state if needed, and sends it to SGW 414. If SGW 414 gets an ok response from GWES 416, it updates the dialog in cache and passes the response as well as the initial presence state notification to the external network. If SGW 414 gets error response from GWES 416, it deletes the dialog in cache and sends error response to the external network.

In some examples and for some network backends, if an external user logins from multiple locations, the user will send multiple subscriptions to the primary network. In such instances, SGW 414 may create and save multiple dialogs, keyed by the external user id, in its memory cache. If later a primary network client buddy sends presence notification to the external user, the notification will be delivered to each external location corresponding to the multiple dialogs saved with SGW 414.

Figure 7:
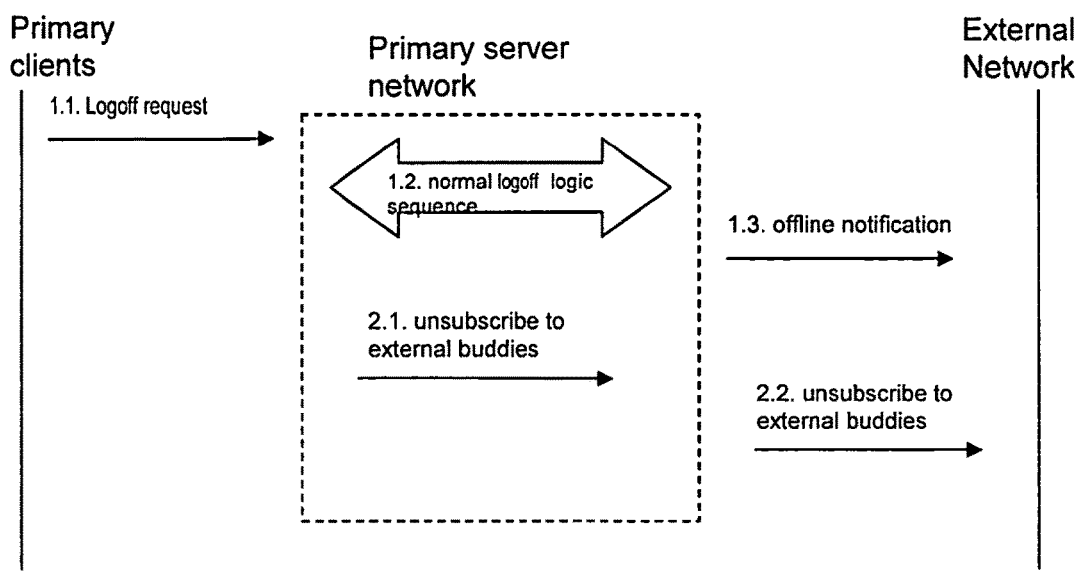
Figure 8:
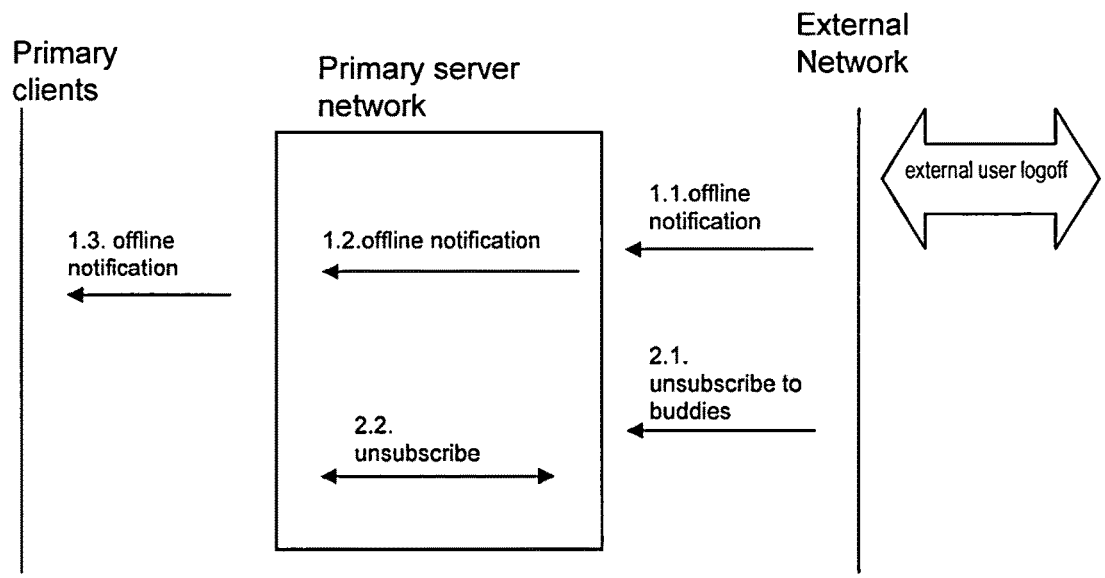

FIGS. 7 and 8 illustrate exemplary logoff processes for a primary user and an external user respectively. If the primary network client logs off, offline notification is sent to external watchers (e.g., from ES 418/RBES to GWES 416 to SGW 414 to the external network; 1.1-1.3). Additionally, an unsubscribe process for external buddies' presence is performed (e.g., from ES 418 to GWES 416; 2.1-2.2). For example, GWES 416 looks up SGW keys from SM 442, and passes the request to the corresponding SGWs 414. It then removes the SGW route record from SM 442. SGWs send unsubscribe request to the external network and delete the corresponding dialogs in its memory cache.

If the external user logs off, offline notification is sent to primary network client watchers (e.g., from the external network to the SGW 414 to GWES 416 to primary network clients; 1.1-1.3). Further, an unsubscribe process of primary network clients buddies presence is performed (e.g., from the external network to SGW 414 to GWES 416 to RBES 418; 2.1-2.2). SGW 414 deletes corresponding dialogs and sends GWES 416 an unsubscribe request. GWES 416 removes SGW 414 route from SM 442 and removes the external users from the primary network clients buddies' watcher list (i.e., the reverse buddy list).

Figure 9:
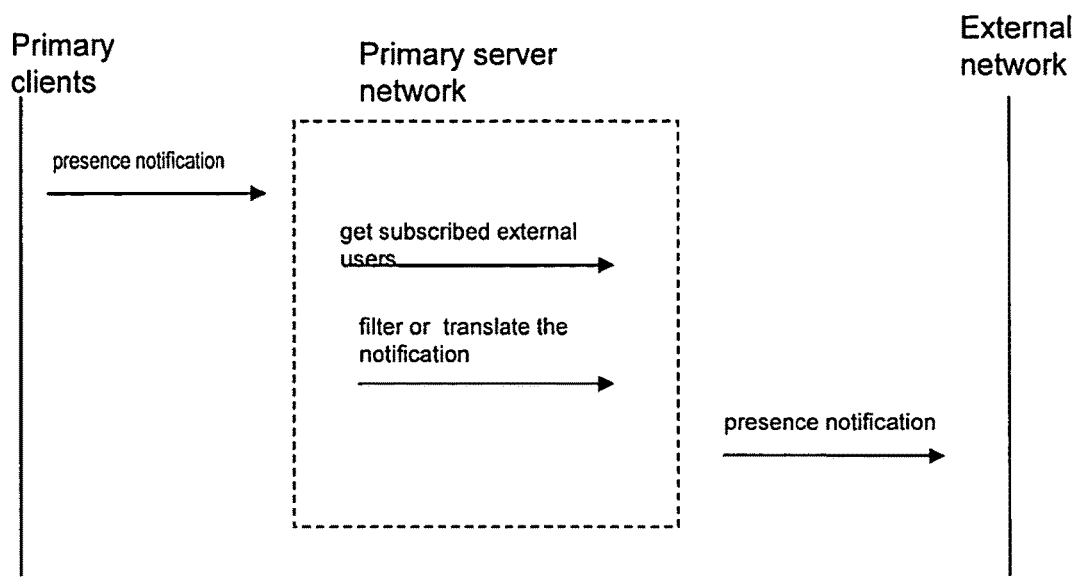
Figure 10:
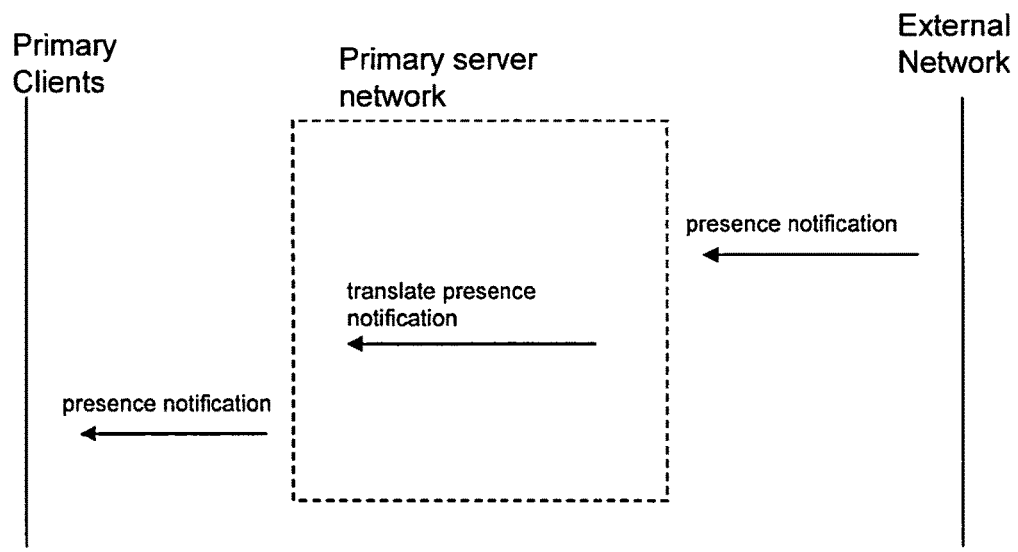

FIGS. 9 and 10 illustrate processes associated with primary network clients and external users changing their presence states respectively. In one example, a primary network client changes their presence, which issues a presence notification. RBES 418 identifies which reverse buddies are from the external network using federation domain info, and sends the notification to GWES 416. The presence notification change is then sent to the external network for external watchers. In one example, GWES 416 filters or translates the primary network client state into an appropriate external state. GWES 416 looks up SGW key from SM 442 and sends the notification to SGW 414. SGW 414 sends the notification to the external network for each existing dialogs; if no dialog is found, it should send unsubscribe request back to GWES 416 to stop future notifications. In one example, if the match between the primary network client state and external state is not matched up, the notification is filtered out (dropped) by GWES 416.

If the external user changes presence state SGW 414 finds corresponding dialog (and may send an error response to the external network if no dialog is found). SGW 414 passes the notification to GWES 416, and GWES 416 translates the presence notification to a matching state for primary network client. The primary network may translate a non-matching state to a native state using a custom message if desired. GWES 416 gets target connection info from UM 420 and delivers the notification to the appropriate primary network client.

Figure 11:
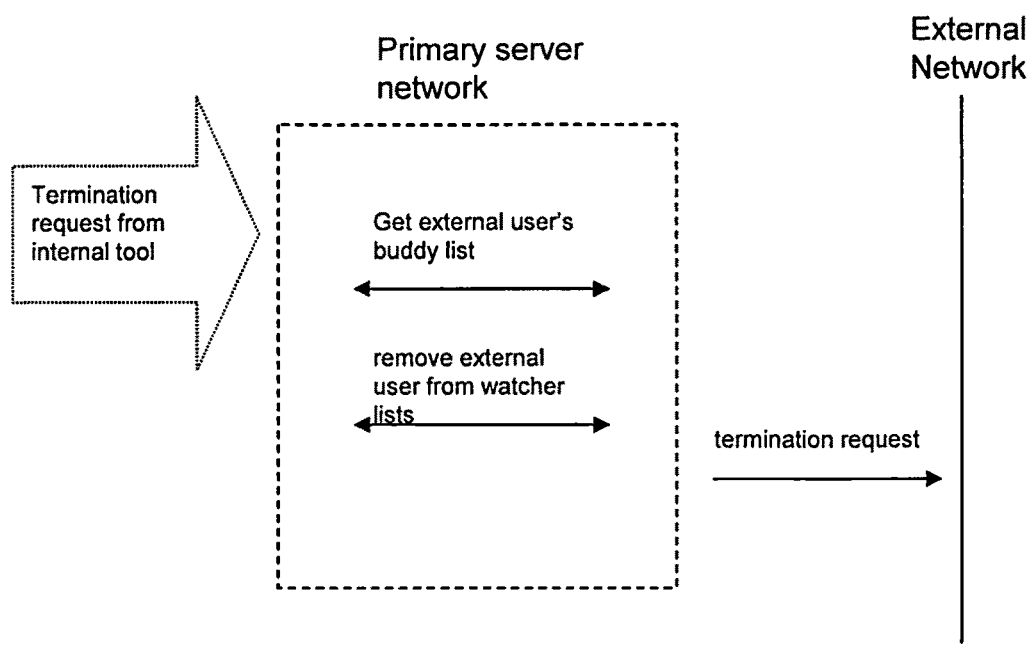
Figure 12:
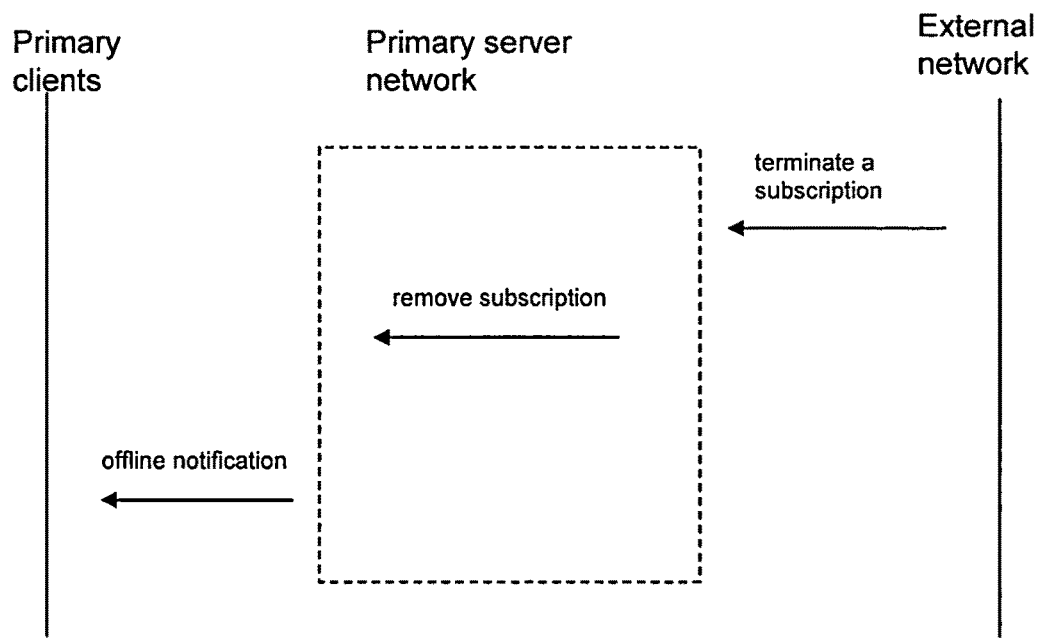

FIGS. 11 and 12 illustrate exemplary processes for users to terminate presence subscription from users of different providers. For example, in FIG. 11 a primary network client terminates presence subscription from an external user, which may be desirable for spam control or the like. The client request to terminate is handled be GWES 416, which requests to terminate subscription of an external user. GWES 416 gets external user's buddy list from GWDB 440, and GWES 416 sends RBES request to remove external users from the reverse buddy list of each primary network client buddy.

The termination request is then sent to the external user (e.g., from GWES 416 to SGW 414 to the external network). In one example, GWES 416 looks-up SGW key from SM 442 and sends termination request to SGW 414. GWES 416 removes SGW route record from SM 442, and SGW 414 cleans up dialogs in its memory cache, and sends termination request to the external network. The external network sends offline notification to the external user and the external network updates its subscription records appropriately. GWES 416 logs the request in its termination log.

Additionally, as shown in FIG. 12, the external network may terminate presence subscription from a native user. In one example, the SGW 414 receives a request to terminate a subscription of a primary network client to the presence of an external user. SGW 414 cleans-up dialog in its memory cache and sends a termination request to GWES 416. GWES 416 removes route record from SM 442, and GWES 416 sends the primary network client offline notification. If the external user already appears offline to the primary network client, the primary network client can decide if the notification should be filtered.

Figure 13:
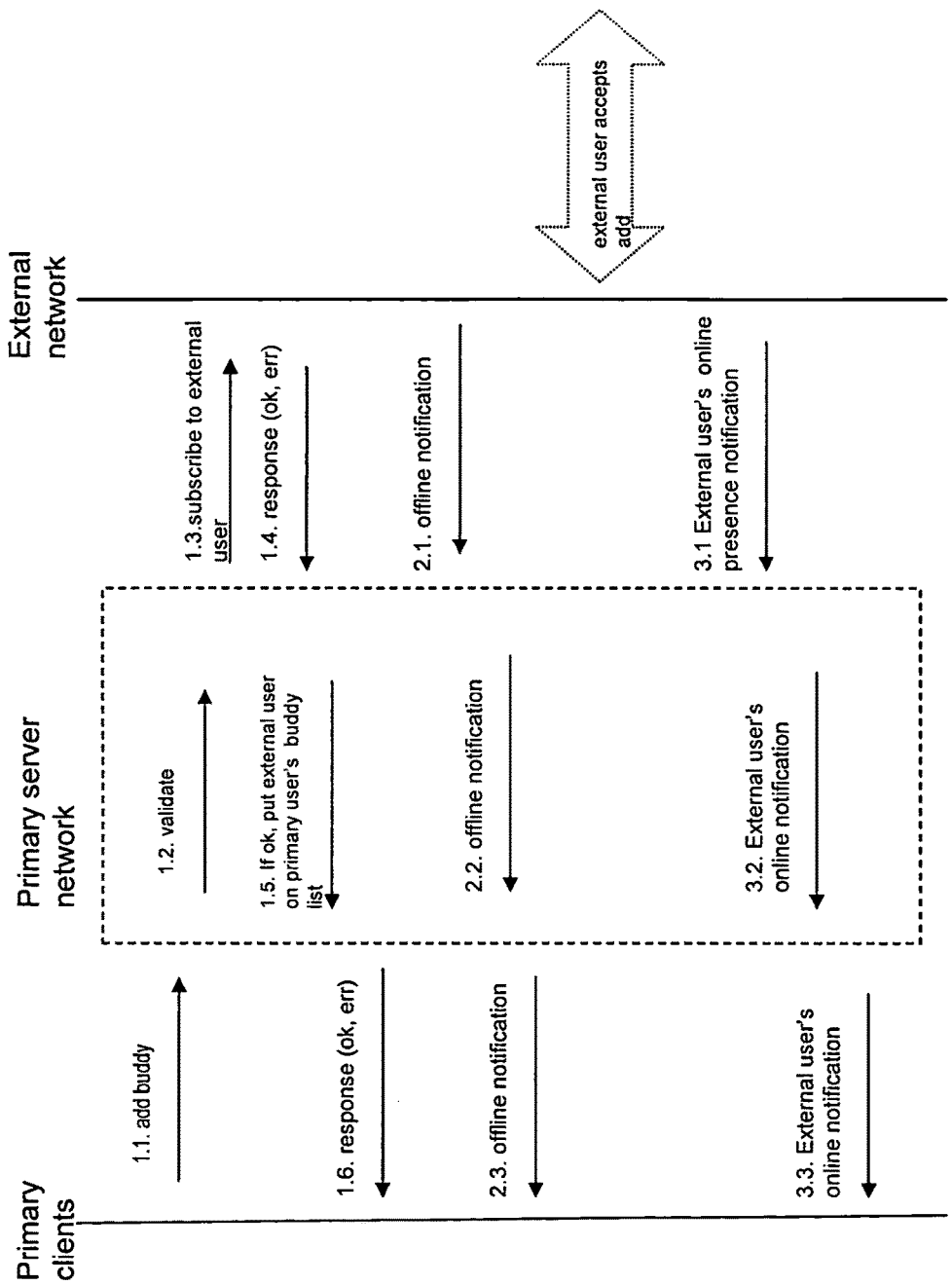
Figure 14:
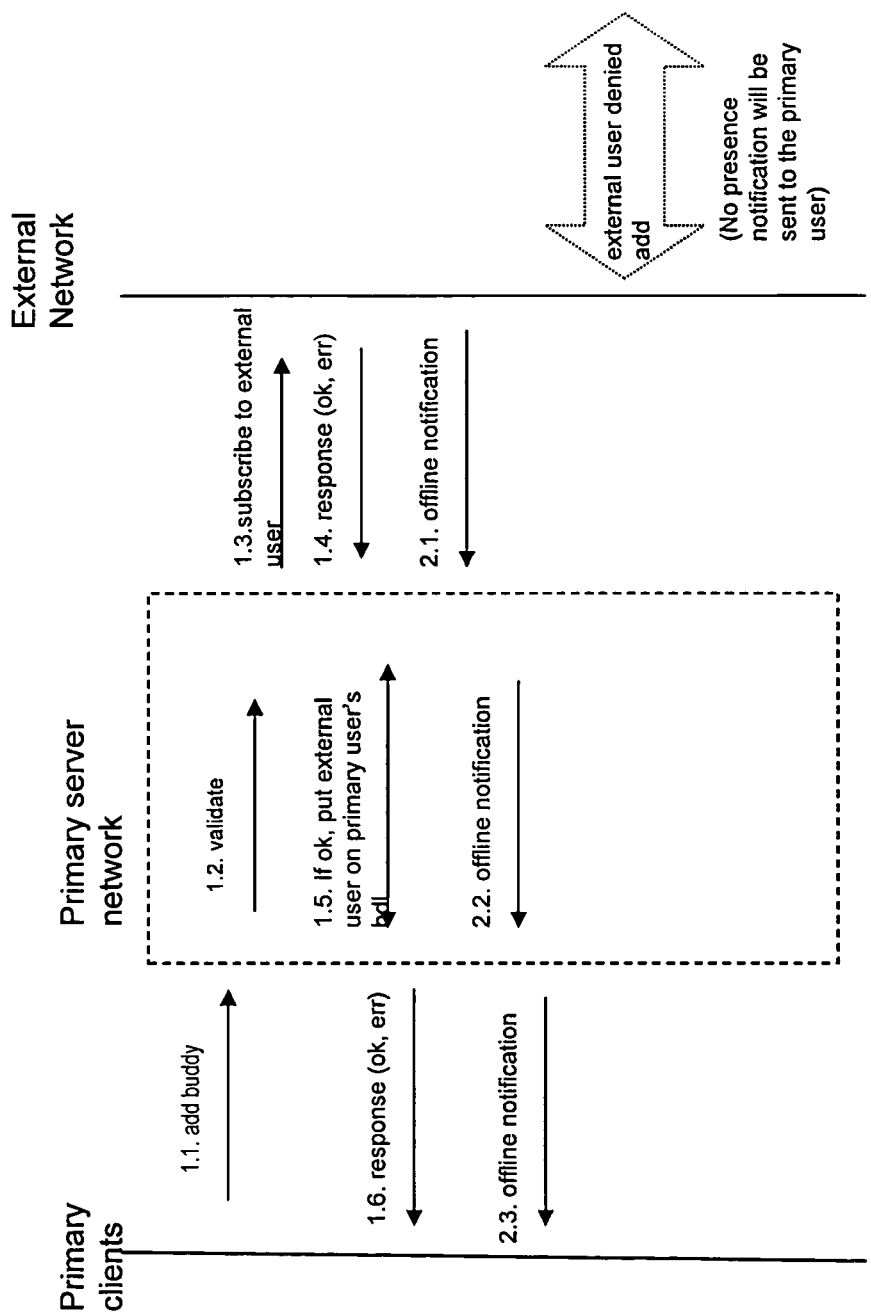

FIGS. 13 and 14 illustrate exemplary processes for a native user to add an external buddy. In a first example, FIG. 13, the primary network client requests to add an external user as a buddy (e.g., to their buddy list etc.). From the external network an initial offline notification, 2.1-2.3 (as a confirmation for subscription triggered by the client's add buddy request) is followed by online notification, 3.1-3.3 (this process assumes the external user has approved primary network client's add buddy request).

In particular, when the primary network client requests to add the external user, ES 418 adds the external user to the primary network client's buddy list in UDB and UM 420, and then passes the request to GWES 416 since the new buddy is an external user. GWES 416 then passes the information to SGW 414 and to the external network to subscribe for the external user's presence (in the case where the primary network client is requesting to add the external user as a buddy). If SGW 414 gets ok response from the external network, SGW 414 saves dialog in memory cache and passes the response to GWES 416. GWES 416 adds the route record to SM 442, and sends ok response to the primary network client. If SGW 414 gets error response from the external network which indicates that the external id is invalid, SGW 414 deletes the corresponding dialog and sends error response to GWES 416. GWES 416 removes the external user from the primary network client's buddy list in UDB and UM 420 and sends error response to the primary network client.

From the external network an offline notification is initially sent as a confirmation for the subscription request sent (e.g., from SGW 414 to GWES 416 to the primary network client that the external user is offline). The primary network client may decide whether to drop the initial offline notification. Finally, from the external network an online notification (assuming the external user has approved the add buddy request) that the user is online.

In one example, the external user is added to the primary network client's buddy list immediately after getting the ok response from the external network for the subscription request. There is no pending state on the particular configuration of this example since there is no need to detect when the external user accepts/denies the add request.

FIG. 14 illustrates an example where the external users denies the add. The process/event flow is similar to that of FIG. 13 absent the last series of events 3.1-3.3 (e.g., absent the external user accepting the add).

Figure 15:
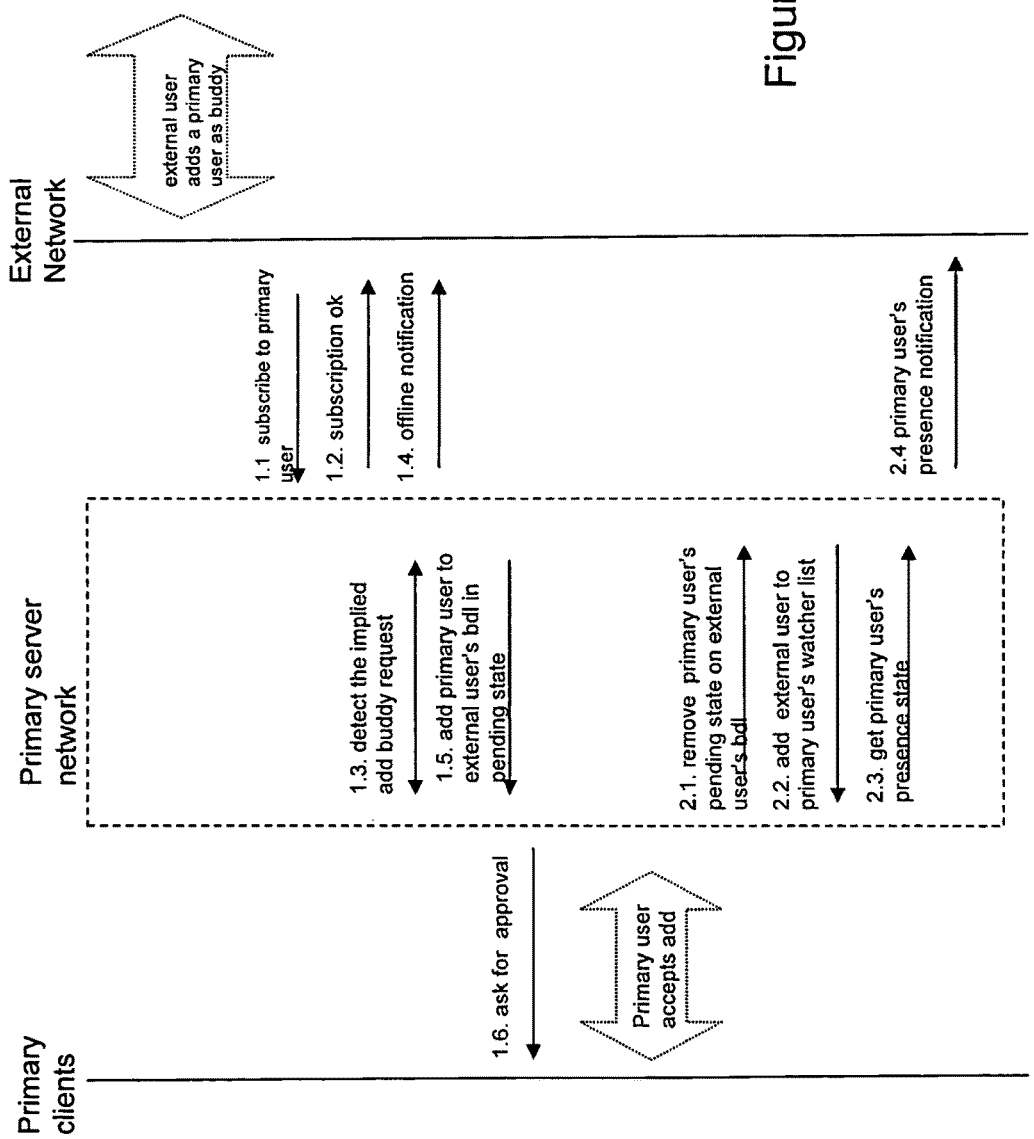
Figure 16:
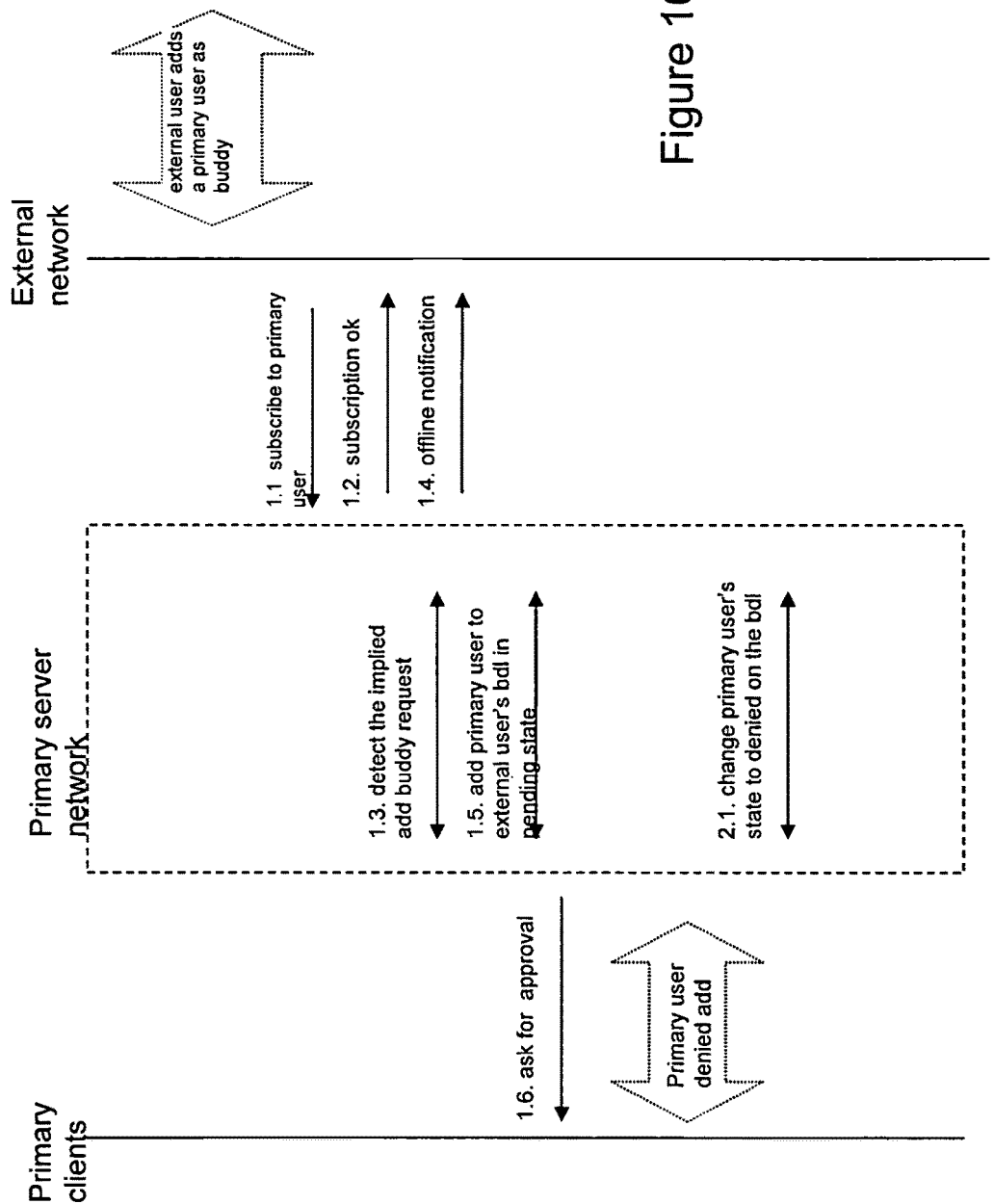

FIGS. 15 and 16 illustrate exemplary processes for adding a primary network client as a buddy for an external user. Generally, the external user requests to add the primary network client as a buddy, and the primary network client approves the add request.

More particularly, the external user requests adding the primary network client as a buddy by subscribing to the primary network client's presence (1.1). SGW 414 sends subscribe request to GWES 416, GWES 416 looks up GWDB 440 and detects that this request implies to add a buddy, since the primary network client is not on the external user's buddy list. GWES 416 looks up UDB 420 to check if the primary network client id is valid. If not, sends error response to external network via SGW 414. If the primary network id is valid, GWES 416 sends an ok response to SGW 414. SGW 414 creates the dialog in cache and passes the ok response to the external network. In one example, the external user is notified that the primary network client is offline (e.g., from GWES 416 to SGW 414 to the external network). GWES 416 adds route record in SM 442, and GWES 416 adds the primary network client to the external user's buddy list in pending state in GWDB 440. Finally (e.g., via GWES 416 to CS 420 to the primary network client) approval is requested from the primary network client.

If the primary network client approves the add request, ES 418 sends add buddy approval request to GWES 416. GWES 416 changes the primary network client buddy's state from pending to active in GWDB 440. GWES 416 sends update request to RBES 418 to add external user to the primary network client's reverse buddy list. GWES 416 gets primary network client's online state from UM 420 and translates it to external state. The primary network client's online presence notification is sent to the external user (e.g., via GWES 416 to SGW 414 to the external network and user).

In GWDB 440, each buddy record contains a state (e.g., active, pending, denied) and a timestamp. The state can be used for various purposes such as managing add buddy flow, and the timestamp can be used to protect primary network clients from excessive SUBSCRIBE from an external network, and may also be used for garbage collection.

FIG. 15 illustrates an example where the primary network client denies the add request. The process/event flow is similar to that of FIG. 14 absent the last series of events 2.2-2.4. Additionally, event 2.1 is to change the primary network client's state from "pending" to "denied" on the external user's buddy list in GWDB 440. In some examples, the external network will not notify the external user of the denial event, however, to avoid a request to subscribe each time the external user relogins, the primary network may keep a denied state associated with the denied request. Buddy records with denied state can be garbage collected after certain period of time.

Figure 17:
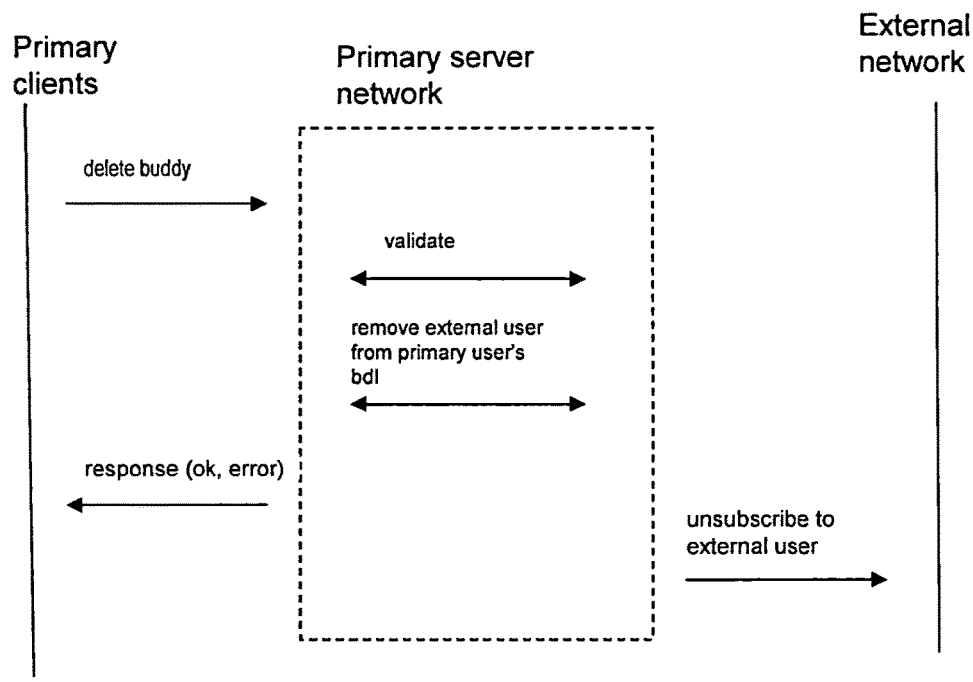
Figure 18:
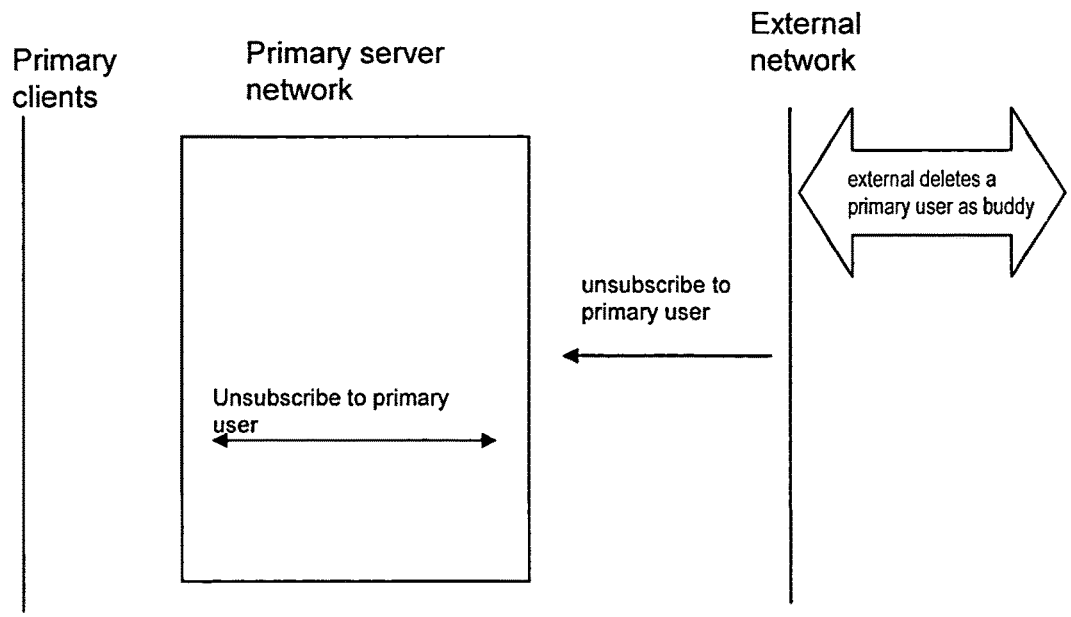

FIGS. 17 and 18 illustrate exemplary processes for deleting a buddy from an external network service provider. In FIG. 17, a primary network client deletes an external buddy. In this example, GWES 416 validates that the external user is a buddy of the primary network client, and GWES 416 removes the external user from the primary network client's buddy list in UDB and UM 420. The primary network client is then notified of the response to the deleted request (e.g., from GWES 416 to CS 420 to the primary network client a response such as ok, error, etc.). Further, GWES 416 communicates to SGW 414 (and to the external network) to unsubscribe to the external user's presence and cleans up dialog and route records.

In FIG. 18, an external user deleting a primary network client from their buddy list is shown. In this example, the external user unsubscribes to the primary network client's presence. SGW 414 cleans up dialog, and SGW 414 sends unsubscribe request to GWES 416. GWES 416 removes the route to SGW 414 from SM 442. Further, GWES 416 removes the external user from primary network client's reverse buddy list.

Figure 19:
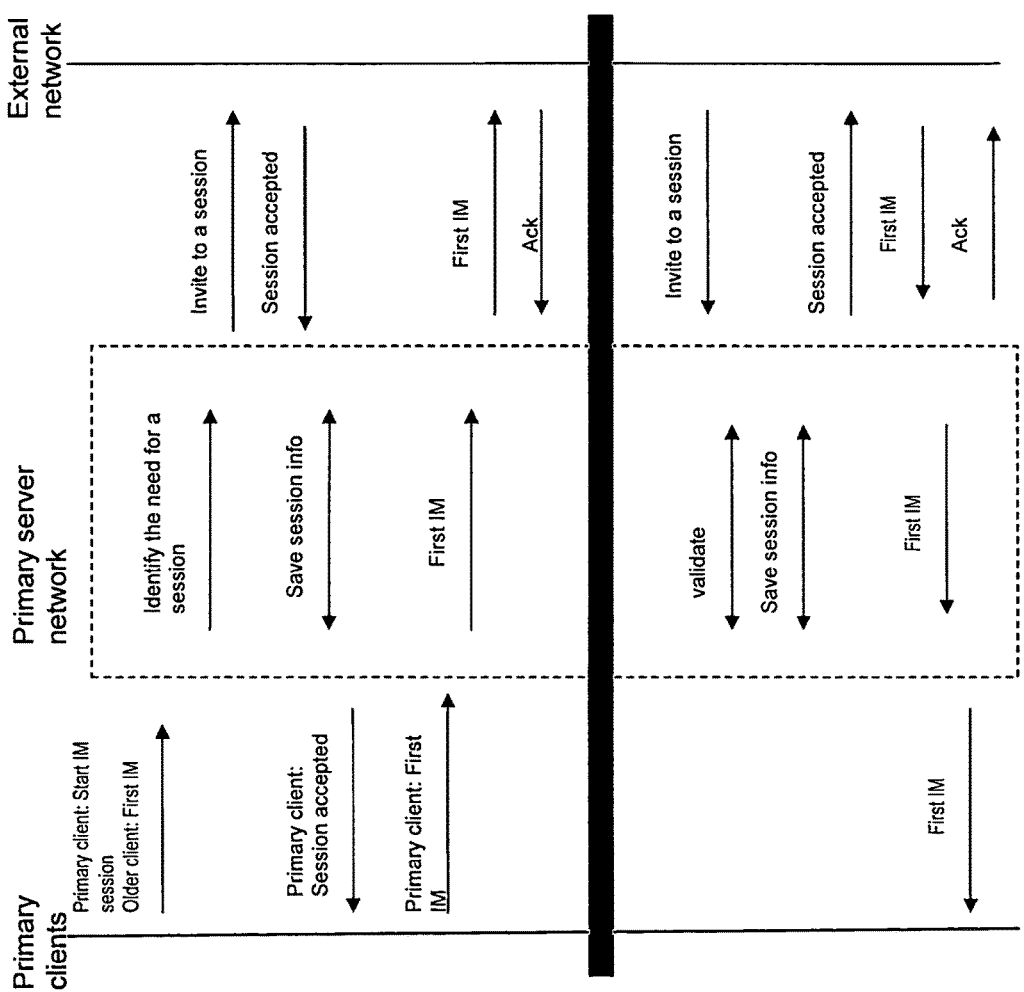

FIG. 19 illustrates an exemplary process for starting an IM session between a primary network client and an external user. In this example, the primary network client initiates an IM session using a primary network client to request to start the IM session with an external user (e.g., the request from the primary network client is communicated from ES 418 to GWES 416). GWES 416 validates the new session. In one example, the system checks if the primary network client does not support session based IM, if so, return error is sent to client, otherwise sends start IM session request to SGW 414. If an IM session dialog already exists, returns ok to GWES 416; if not, sends SIP INVITE request to the external network.

SGW 414 gets a response from the external network, if the response is ok, the session dialog is saved in cache, and otherwise the dialog is deleted. The SGW 414 further sends response to GWES 416. GWES 416 gets response from SGW 414; if response is ok, saves SGW 414 route record in SM and passes the response to primary network client. At this point the primary network client can send an IM communication.

In examples where the primary network client initiates the IM session using a client that does not support session based IM the process is as follows. The primary network client sends a first IM to ES 418. ES 418 identifies the receiver as an external user (using federation domain info or the like), and forwards the request to GWES 416. GWES 416 looks-up SM 442 and determines no IM session exists yet for the sender and receiver, so it proceeds to do new session validation (Check YPC minor in this case, for example). If validation fails, an error is sent to the primary network client, otherwise the first IM is sent to SGW 414. SGW 414 looks-up cache and finds that no session exists yet, and caches the IM and sends SIP INVITE request to external user. SGW 414 gets response from external user; if session accepted, SGW 414 updates the dialog in cache and flush out IM to external, and if the session is rejected, SGW 414 deletes initial dialog in cache and drops the cached IM, and sends response to GWES 416. GWES 416 gets response from SGW 414 if the session is accepted and the SGW 414 saves route in SM 442.

Also shown in FIG. 19 is an example where an external user initiates an IM session with a primary network client. The external network sends SIP INVTE to SGW 414. If IM dialog already exists for the sender and receiver (multiple external network clients are running, for example), SGW 414 sends SIP BYE to external user to end the previous session, then saves the new session dialog to cache. SGW 414 sends start IM request to GWES 416, and GWES 416 validates the new session. For example, GWES 416 checks if primary network client id is valid, checks for YPC restriction, and checks if the primary network client's (receiver's) ignore list. If the validation is ok, GWES saves SGW key in SM and returns ok to SGW 414; otherwise it sends error to SGW 414. SGW 414 checks response from GWES 416, and updates or deletes the initial dialog accordingly. SGW 414 then sends ok or error response to external network.

Figure 20:
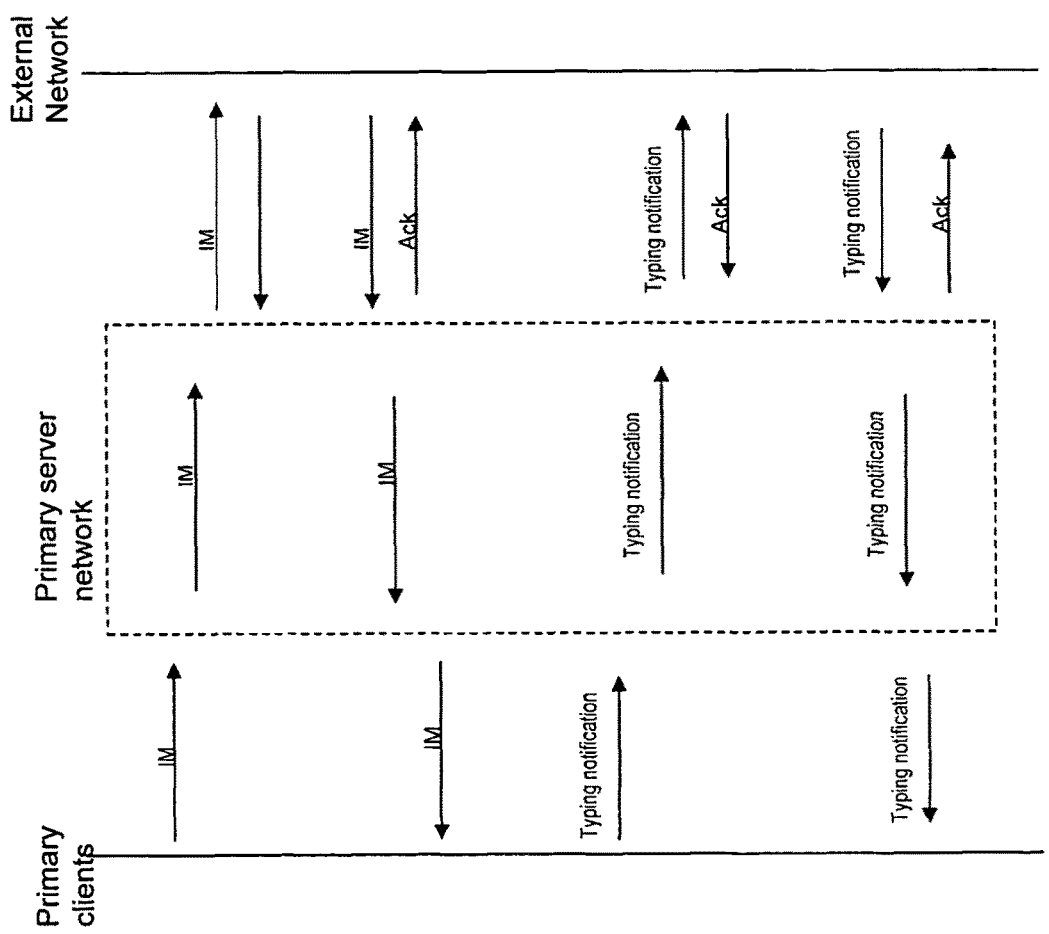

FIG. 20 illustrate exemplary event flows for typing notifications between a primary network client and external user. After the IM session is established, IM and typing notification requests can be exchanged. For request coming from the primary network to the external network, GWES 416 looks up SGW key from SM, then sends the request to corresponding SGW 414 server, which then forwards it to the external network. For request coming from the external network to the primary network, SGW 414 looks up the corresponding dialog in cache; if dialog is not found, the request will be dropped; otherwise the request will be sent to GWES 416, which then deliver it to the appropriate primary network client.

Figure 21:
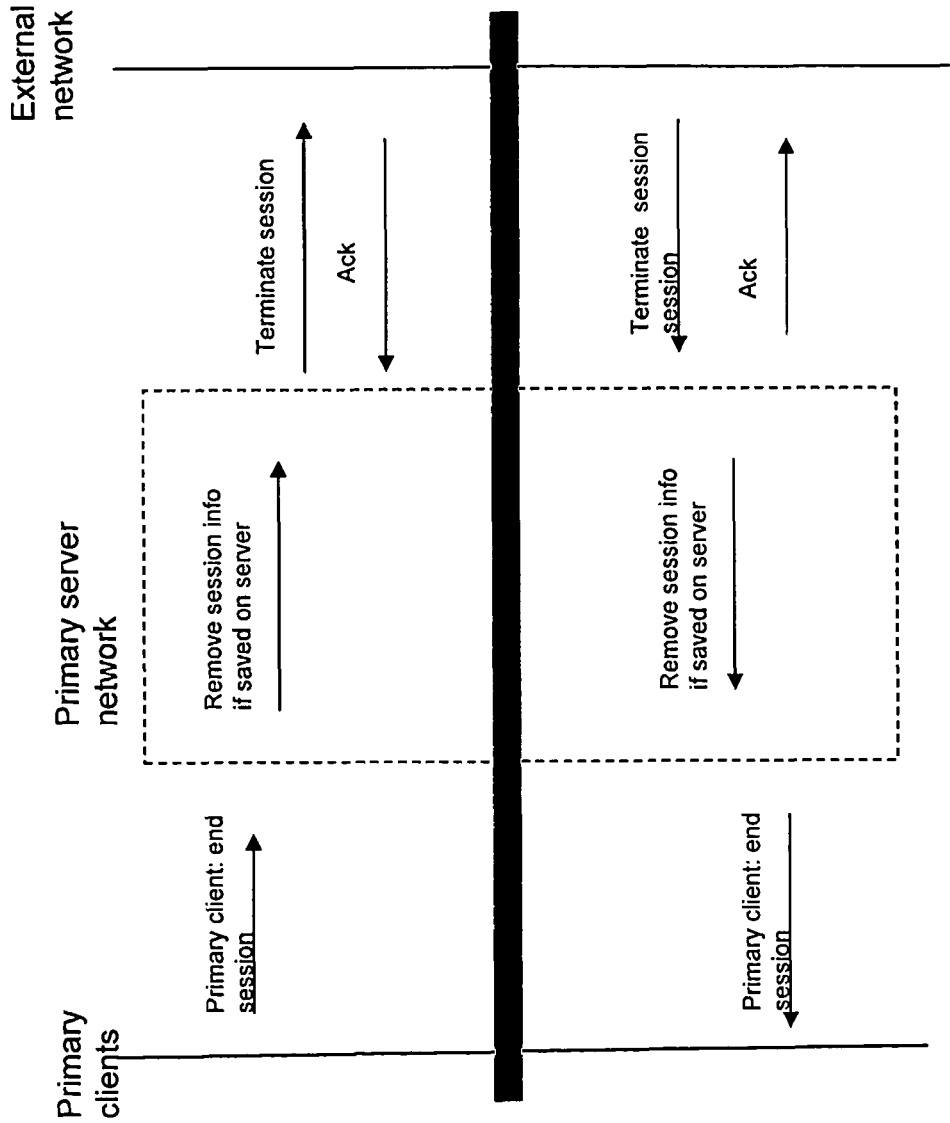

FIG. 21 illustrates event flows for ending an IM session between a primary network and external user. If the primary network client terminates the IM session, terminate request is propagated through ES 418 to GWES 416 to end the IM session. GWES 416 looks up SGW key from SM 442, sends the request to SGW 414, and deletes SGW route record from SM 442. SGW 414 deletes the dialog in cache, and sends SIP BYE to the external user to end the session.

If the external user ends an IM session, the external user sends a SIP BYE to SGW 414. SGW 414 deletes the dialog in cache and sends end IM session request to GWES 416. GWES 416 deletes SGW route record in SM. Further, GWES 416 may send the primary network client an end IM session request.

Figure 22:
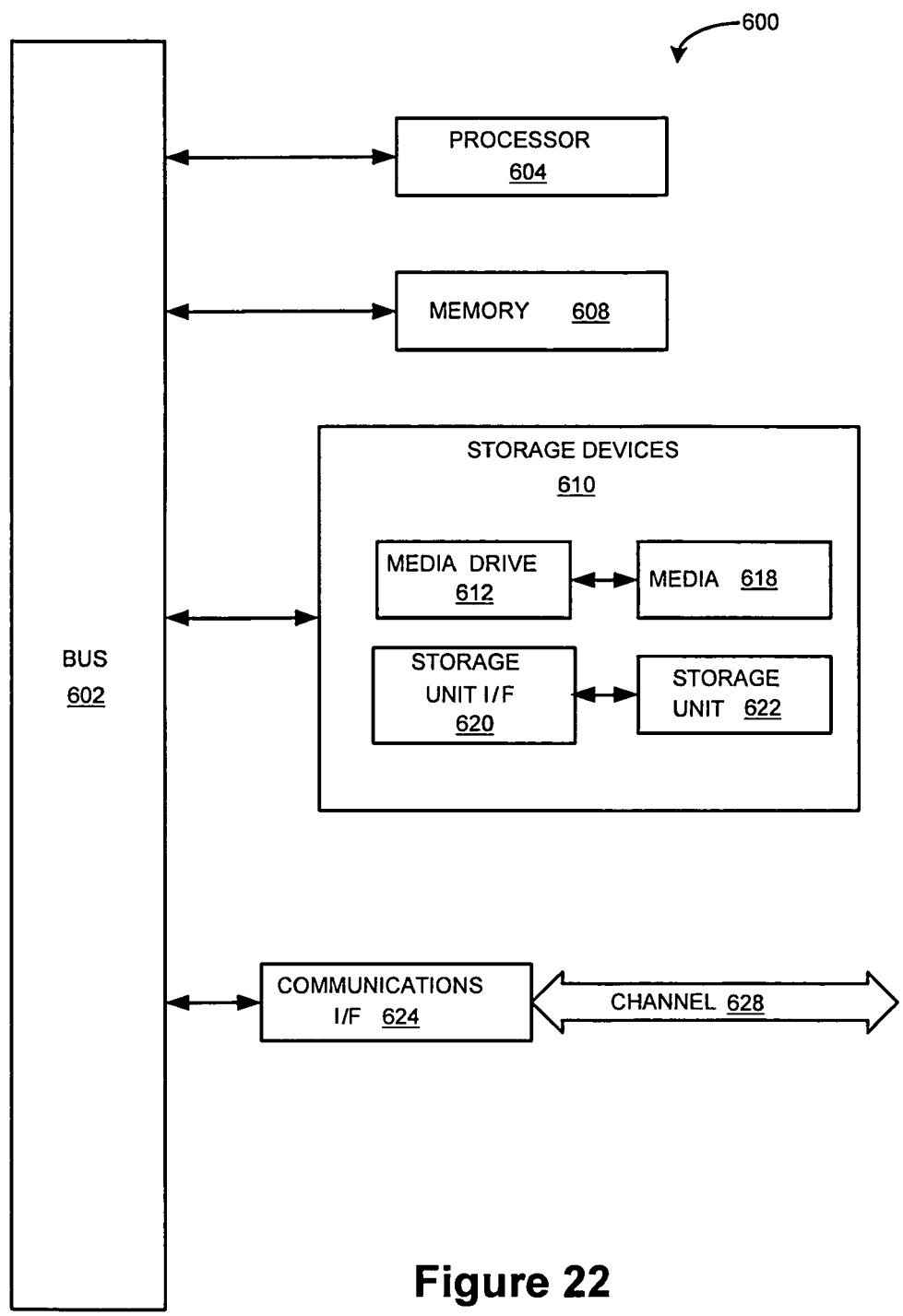
FIG. 22 illustrates an exemplary computing system that may be employed to implement processing functionality for various aspects of the invention.

FIG. 22 illustrates an exemplary computing system 600 that may be employed to implement processing functionality for various aspects of the invention (e.g., as a gateway server or machine). Those skilled in the relevant art will also recognize how to implement the invention using other computer systems or architectures. Computing system 600 may represent, for example, a desktop, mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, preferably random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage mechanism 610 may include other similar instrumentalities for allowing computer programs or other instructions or data to be loaded into computing system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical, or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 608, storage device 618, storage unit 622, or signal(s) on channel 628. These and other forms of computer-readable media may be involved in providing one or more sequences of one or more instructions to processor 604 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. An apparatus comprising a processor and memory, the memory storing processor-executable logic comprising:
   interface logic that receives, at a stateless gateway server comprised within a primary service provider network, a communication for a client of the primary service provider network from at least one of a plurality of external instant messaging service provider networks, wherein the received communication is received in a secondary protocol associated with an external instant messaging provider network transmitting the communication;
   use logic that uses, at the stateless gateway server, a session manager as a centralized storage, the session manager storing information comprising a dialog state associated with the received communication;
   received communication translation logic that translates, at the stateless gateway server, the received communication from the secondary protocol to a primary protocol, the primary protocol native to the primary service provider network and the primary protocol being different from the secondary protocol; and
   presence data management logic that creates, at the stateless gateway server, for the client of the primary service provider network, a plurality of logical termination points that facilitate direct communication between the client of the primary service provider network and respective ones of the plurality of external instant messaging service provider networks;
   sent communication translation logic that translates, at the stateless gateway server, a communication to be sent to the external instant messaging service provider from the primary protocol to the secondary protocol; and
   transmission logic that transmits, by the stateless gateway server, the communication translated to the secondary protocol to the external instant messaging service provider.

2. The apparatus of claim 1, wherein the received communication comprises at least one of a subscribe request, an invite request, or an unsubscribe request.

3. The apparatus claim 1, wherein the sent communication comprises at least one of a notification to watchers, a subscribe request, an invite request, or an unsubscribe request.

4. The apparatus of claim 1, the memory further comprising:
the session manager as the centralized storage, the session manager storing information comprising a dialog state associated with the received communication.

5. The apparatus of claim 1, the memory further comprising:
a connection manager that processes the received communication, wherein the connection manager includes an end point present dialog manager.

6. The apparatus of claim 1, the memory further comprising:
a buddy store that stores primary network buddies of external users, wherein the primary network buddies are associated with the receiving service provider network and the external users are associated with the external instant messaging service providers.

7. A method comprising:
receiving, at a stateless gateway server comprised within a primary service provider network, a communication related to an instant messaging service for a client of the primary service provider network from at least one of a plurality of external instant messaging service provider networks, wherein the received communication is formatted according to a secondary protocol associated with the external instant messaging service provider network transmitting the communication;
using, at the stateless gateway server, a session manager as a centralized storage, the session manager storing information comprising a dialog state associated with the received communication;
translating, at the stateless gateway server, the received communication from the secondary protocol to a primary protocol, the primary protocol native to the primary service provider network and the primary protocol is different than the secondary protocol; and
creating, by the stateless gateway server, for the client of the primary service provider network, a plurality of logical termination points that facilitate direct communication between the client of the primary service provider network and respective clients of the plurality of external instant messaging service provider networks;
translating, at the stateless gateway server, a communication to be sent to the external instant messaging service provider from the primary protocol to the secondary protocol;
transmitting, by the stateless gateway server, the communication translated to the secondary protocol to the external instant messaging service provider.

8. The method of claim 7, wherein the received communication comprises at least one of a subscribe request, an invite request, or an unsubscribe request.

9. The method of claim 7, further comprising:
causing, by the stateless gateway server, a communication related to instant messaging service to be sent to the external instant messaging service provider network, the communication being sent according to the secondary protocol.

10. The method of claim 7, further comprising:
routing, by the stateless gateway server, the translated communication to the client of the primary network according to the primary protocol.

11. A computer-readable non-transitory storage medium comprising computer-readable instructions for:
receiving, at a stateless gateway server computer comprised within a primary instant messaging service provider network, a communication related to an instant messaging service for a client of the primary service provider network from one of a plurality of external instant messaging service provider networks, wherein the received communication is formatted according to a secondary protocol associated with the external instant messaging service provider network transmitting the communication;
using, at the stateless gateway server, a session manager as a centralized storage, the session manager storing information comprising a dialog state associated with the received communication;
translating, at the stateless gateway server, the received communication from a secondary protocol to a primary protocol, the primary protocol native to the primary instant messaging service provider network and the primary protocol is different than the secondary protocol; and
creating, by the stateless gateway server, for the client of the primary instant messaging service provider network, respective logical termination points that facilitate direct communication between the client of the primary service provider network and the plurality of external instant messaging service provider networks;
translating, at the stateless gateway server, a communication to be sent to the external instant messaging service provider from the primary protocol to the secondary protocol;
transmitting, by the stateless gateway server, the communication translated to the secondary protocol to the external instant messaging service provider.

12. The computer-readable non-transitory storage medium of claim 11, wherein the received communication comprises at least one of a subscribe request, an invite request, or an unsubscribe request.

13. The computer-readable non-transitory storage medium of claim 11, further comprising instructions for:
causing, by the stateless gateway server, a communication related to the instant messaging service to be sent, wherein the communication is sent according to the secondary protocol.

14. The computer-readable non-transitory storage medium of claim 11, further comprising instructions for:
routing, by the stateless gateway server, the translated communication to the client of the primary instant messaging service provider network.

* * * * *